United States Patent
Peng

(10) Patent No.: US 6,317,754 B1
(45) Date of Patent: Nov. 13, 2001

(54) SYSTEM FOR USER CONTROL OF VERSION /SYNCHRONIZATION IN MOBILE COMPUTING

(75) Inventor: Luoscheng Peng, San Jose, CA (US)

(73) Assignee: Mitsubishi Electric Research Laboratories, INC, Cambridge, MA (US)

(*) Notice: Subject to any disclaimer, the term of this patent is extended or adjusted under 35 U.S.C. 154(b) by 0 days.

(21) Appl. No.: 09/110,748

(22) Filed: Jul. 3, 1998

(51) Int. Cl.[7] .................................................. G06F 17/30
(52) U.S. Cl. .............................. 707/203; 707/201; 707/10
(58) Field of Search ........................... 707/203, 201, 707/202, 10, 8; 709/219, 236; 455/435, 502, 462; 348/13; 370/515, 336; 379/1, 5

(56) References Cited

U.S. PATENT DOCUMENTS

| | | | |
|---|---|---|---|
| 5,581,753 | * 12/1996 | Terry et al. | 707/201 |
| 5,710,922 | * 1/1998 | Alley et al. | 707/201 |
| 5,729,735 | * 3/1998 | Meyering | 707/10 |
| 5,831,664 | * 7/1998 | Wharton et al. | 348/13 |
| 5,893,116 | * 4/1999 | Simmonds et al. | 707/201 |
| 5,926,816 | * 7/1999 | Bauer et al. | 707/8 |
| 5,978,805 | * 11/1999 | Carson | 707/10 |
| 5,978,813 | * 11/1999 | Foltz et al. | 707/201 |
| 5,991,771 | * 11/1999 | Falls et al. | 707/202 |
| 5,999,813 | * 12/1999 | Lu et al. | 455/435 |
| 6,028,868 | * 2/2000 | Yeung et al. | 370/515 |
| 6,029,195 | * 2/2000 | Herz | 709/219 |
| 6,052,735 | * 4/2000 | Ulrich et al. | 709/236 |

* cited by examiner

*Primary Examiner*—Sanjiv Shah
(74) *Attorney, Agent, or Firm*—Dirk Brinkman

(57) ABSTRACT

A universal system is provided for synchronizing servers which accommodates wide area mobile computing while at the same time making the process more efficient. The system includes a network of primary servers with high performance reliable links making up the backbone of the synchronization process to which secondary servers are linked via typically less reliable links. Moreover, synchronization from a mobile computer can be done whether in client/server mode, or peer-to-peer to support any topology of secondary servers. In one embodiment while the primary servers are automatically and frequently synchronized, synchronization of the secondary servers is under the control of the user which prevents unintended synchronization. A summarizing version vector is used to minimize the amount of data transmitted by avoiding the necessity for exchanging version vectors for individual objects. This summarizing version vector also permits differential synchronization using summarizing version vectors and update stamps, the generation of a latest common version vector to purge off differential updates on a server, restart of synchronization from the point of previous failure with data from an unaffected server, and fine grain synchronization by permitting a differential update as the atom of data to be transmitted. Additionally, the system automatically switches between whole object synchronization and differential synchronization. Further, the subject system permits synchronization between different systems because the semantics of the data is segregated from the synchronization due to extracting updates in a standard format and synchronizing based on a standard protocol.

8 Claims, 11 Drawing Sheets

SYSTEM FOR USER CONTROL OF VERSION /SYNCHRONIZATION IN MOBILE COMPUTING

BACKGROUND OF THE INVENTION

It will be appreciated that with the proliferation of mobile computing in the form of laptops and the generation of versions of data at various points, there is a need to be able to synchronize the versions of the data created at multiple locations. This version synchronization must take place over a variety of different platforms as individuals move from location to location, state to state, and country to country.

When multiple users work on the same version of a document or data, in the past there have been various ways of reconciling the documents. Many systems have been provided to alert one user to the fact that another document has been altered and to either update with the latest version or reject the latest version at the user's discretion. Log files have been used in the past to ascertain the time that a version was generated and version vectors have been utilized for some time to detect conflicts between object replicas.

As will be appreciated, there have been several approaches to the detection of resolving update conflicts such as describe d by James J. Kistler et al., Disconnected Operation in the CODA File System, ACM Transactions on Computer Systems, 10(1), 1992; Peter Reiher et al., Resolving File Conflicts in the Ficus File System, in USENIX Conference Proceedings, USENIX, June 1994; and, Douglas B. Terry et al., Managing Update Conflicts in Bayou, a Weekly Connected Replicated Storage System, in Proceedings of the Fifth Symposium on Operating System Principles, ASM, December 1995. The CODA and Ficus systems utilize version vectors to detect conflicts between object replicas as first proposed by D. Stott Parker et al., Detection of Mutual Inconsistency in Distributed Systems, IEEE Transactions on Software Engineering 9(3), May 1993, where the Bayou system does not detect conflicts itself, but rather relies on the application.

Conflict detection utilizing version vectors has evolved into two basic paradigms. One paradigm, as exemplified by Ficus, involves utilizing a version vector to characterize an individual object replica's current state relative to other replicas. Another paradigm which can be inferred by the CODA system is applying version vectors to both object replicas and the replication unit that contains the set of objects.

With respect to the CODA system it will be appreciated that it is a file replication system which does not support peer-to-peer synchronization. It is in essence a client/server system which will not allow two clients to synchronize directly with each other. For example, if two mobile users want to exchange each other's data this must be a peer-to-peer synchronization if they didn't know each other before. The only way two such clients can possibly synchronize their data is via a common server. If the two clients become disconnected, then no synchronization can occur in real time. The CODA system is also not well suited to mobile computing because of the way it caches data and synchronizes with the CODA servers. In CODA when a server is opened, the client always tries to get the latest version of the file among all servers available. When the file is closed the client always tries to synchronize with all servers available. This is extremely expensive due to the heavy data transmission. Moreover, CODA cannot support disconnected operation if a file access was not cached on the client prior to the disconnection. This is because in CODA the data is not replicated as a whole but rather the files are cached one by one. Thus the CODA system is complicated when trying to apply it to mobile computing as it requires parallel synchronization with multiple servers with every open and close of a file.

With respect to the Ficus system, it is a file replication system which does not support client/server synchronization. It is essentially a peer-to-peer system and as such all synchronization between replication sites is automated. This is not economical in the mobile computing environment where it may not be desirable because of the expensive and unreliable nature of the communications links. The Ficus system may also violate the semantics of an application due to the automatic synchronization, making this system not applicable in such cases. Since synchronization in Ficus is realized by using version vectors maintained by individual files, the version vectors need to be exchanged for each file. This is considered not efficient for wireless communication. For example, all the version vectors of files must be transmitted between servers, although the files on both servers may be the same. Also, the Ficus system does not support differential synchronization because it sends whole files during the synchronization process in an all-or-none manner.

Finally, the Bayou system is a data base replication system which supports differential synchronization by utilizing a log of writes applied to the database. However, the Bayou system imposes using a single primary server to globally finalize the order and commitment of writes. A single primary server, if down, delays the final commitment of the writes. Thus if the primary server is down, the final order of the writes cannot be established. This delays the ability of other servers to see the stabilized database as soon as possible. Moreover, the Bayou system requires applications to add conflict detection and resolution code to every write they generate. This requirement leads to problems. First, the conflict detection is not done by the system, but by the application, which can be a burden to some of the applications. Secondly, this code for conflict detection and resolution must be propagated along with each of the writes which can greatly increase the cost and traffic of data synchronization.

Moreover, all of the above systems are not flexible enough to deal with different data types across different systems.

It is therefore necessary to provide a system which can cope with all of the problems described above, especially for the mobile computing environment.

SUMMARY OF THE INVENTION

In order to solve the above problems, especially in a mobile computing environment in which links to either a central server or peer-to-peer system are oftentimes unreliable, a system is provided for reliable synchronization of versions of an object stored at different servers which involves the replacement of either the single central server or a peer-to-peer server system with a network of primary servers linked with high performance reliable links which serve to synchronize secondary servers. The use of the primary servers permits the data to be distributed in a wider area with better data consistency and more reliability because of the use of multiple primary servers. By making the mobile computer a secondary server, this distinguishes these less reliable servers from those servers which are the backbone of the synchronization process.

In one embodiment, the primary servers are automatically and frequently synchronized in order to maintain good data consistency among the primary servers. On the other hand, the less reliable synchronization from the secondary servers is controlled from the secondary servers so that communication costs can be reduced and so that the document or other data will not be synchronized unless authorized by the user at the secondary server. This permits the user to work with drafts of documents or uncompleted software or programming which is not to be synchronized before it is finished.

As an important feature, in the subject system a summarizing version vector is used to minimize the amount of data transmitted in the synchronizing process by avoiding the necessity for exchanging version vectors for individual objects, whether or not there is any difference in the two objects being synchronized.

The term summarizing version vector as used herein means a vector having fields which summarize the state of the object container at a server. Each summarizing version vector is a vector of update stamps. Each update stamp has a field for the associated object container's identifier and a field for the associated time stamp.

In the case that the objects are not the same, in the prior art, version vectors for each object at a first location were sent to a second location, with a corresponding update being sent back to the first location. This created an a situation in which needless data was transmitted.

In the subject system a single summarizing version vector is sent from a first location to a second location, and all the updates are then returned all at once to the first location. In one embodiment, the summarizing version vector is examined at the second location to determine if a whole object or a portion of the object needs to be sent to the first location. This is accomplished by either defining a version vector to a whole object or defining a version vector to the base of an object and the update stamp for each of its differential updates.

As used herein the base of an object refers to an object in its initial form absent any changes reflected by differential updates.

Next the received summarizing version vector is compared with either the above version vectors of the individual objects or the update stamps for individual differential updates. As noted above, the update stamp of a differential update consists of the identifier of the object container which generated it and the time stamp when it was generated.

All of the whole objects or differential updates are only sent to the first location if their version vectors or updated time stamps are either newer than the received summarizing version vector or conflicts with it, thus eliminating the unnecessary version vector transfer associated with prior art systems. Thus the summarizing version vector system eliminates repeated transfer of version vectors associated with individual objects.

Another use for the summarizing version vector is as follows. It will be noted that in the past, synchronization systems have operated on an all or nothing basis, meaning that if the synchronization fails before completion, then all of the data must be present. In the subject system, when an update is sent from a first server to a second server, both the version vector of the corresponding object and the summarizing version vector in the second sever will be updated right after it successfully receives the update. Therefore, when synchronization fails, the synchronization will be restored without resending the updates which were already received by the second server in the previous synchronization by comparing the first server's summarizing version vector with the second server's updated version vector. This offers more fine grain synchronization and is therefore more fault tolerant. This is because in the subject system the unit of transmitted data may be a differential update, called an atom because of its small size. This is distinguished from the prior art systems which must transmit the whole object as the unit of transmitted data. If more than two servers are involved, the synchronization may be restored between the first server and the second server after the point of failure if in the meantime a third server has synchronized with the second server between the time of the failure and the time of the restart. The above is made possible by the use of the summarizing version vector.

It will be appreciated that the object in a container may be any object, for instance a document, a program, or a row of a table in a relational database, making the subject system a universal system. This integrates the synchronization process for various forms of data and is made possible by the separation of the semantics of objects from the synchronization. This is in contrast to existing systems which are dependent on the form of the data.

As one important aspect of the subject invention, the subject system permits synchronization between different systems such as synchronizing between a Word document, a McDraw document and a FrameMaker document because the semantics of the data may be separated from the synchronizing. This is accomplished by extracting updates in a standard format and synchronizing based on the standard protocol.

In operation, an update at one location in one format is converted to an update in the standard protocol. The update in the standard protocol is transmitted to a second location where it is converted to the format of the object at the second location.

Moreover, the subject system uses differential synchronization to minimize the data transfer to only that data which is changed between versions of objects. As a special feature of the subject invention, the system switches from whole object synchronization to differential synchronization when, for instance, local memory is full or when disc space is limited. Additionally when an object at one location is very old, if differential synchronization is being used, it is convenient to update the entire or whole object at this second location by automatically shifting to whole object synchronization.

It is a further feature of the subject invention that synchronization from a mobile computer can be done either in the client/server mode from secondary server to primary server, or can be done amongst the secondary servers, either peer-to-peer or in a hierarchical system, thus permitting mobile-to-mobile synchronization. For example, if one secondary server is a user's desktop computer and another secondary server is a mobile device for secondary use, then data synchronization between the two secondary servers is of a client-server type, while the data synchronization of two mobile devices for instance owned by two salesmen for exchanging each other's sales data is of the peer-to-peer type. As a result of the fact that the subject system supports both peer-to-peer and hierarchical structures, the subject system will support any topology of the secondary servers.

Because oftentimes a server is only concerned with data from a selected number of servers, it is unnecessary to synchronize with all of the servers in the system. In a system which has a large number of servers, only some of which have data which one wishes to synchronize, if one were to attempt to keep track of all objects and all updates, memory would be quickly exhausted.

In order to solve this problem in one embodiment of the subject invention, a latest common ancestor version vector is utilized to selectively purge updates and version changes at a selected group of servers which are older than or equal to this latest common ancestor version vector by purging off differential updates or deleted objects which have propagated to the group of the servers in question, e.g. the selected servers.

Ideally, a server should purge off differential updates or deleted objects only if all of the servers in a system have received the updates. However, because the number of servers, especially the secondary servers, dynamically changes, and some servers may be disconnected from the whole system for a very long time, purging off updates only after all the servers received them is impractical and the memory or disk space may be exhausted even before it can actually purge off updates.

Therefore, in the subject system, the system allows a server to select a set of servers and purge off updates if the updates have already propagated to all of the selected servers. Furthermore, a selected server may also be excluded in the consideration of purging off of updates if it is not synchronized with the selecting server for a time period in excess of a preset limit.

In the subject system, this purging off of updates is done by utilizing the latest common ancestor version vector. When a server synchronizes with any of the selected servers, it will record the selected servers versions vector locally. The latest common ancestor version vector is then calculated from its own version vector and all of the selected server's version vector. Any differential updates or deleted objects' information will be purged off if their update stamps or version vectors are newer than or equal to the calculated latest common version vector. The synchronization algorithm as shown below uses both summarizing version vectors and update stamps to minimize the data transmitted. During synchronization, the subject algorithm goes through the below listed steps in order to realize the propagation of updates from one server to another:

1) The first server sends its summarizing version vector to the second server.
2) Upon receiving the summarizing version vector of the first server, the second server sends to the first server its summarizing version vector, followed by all of the identifiers of objects which exist in the second server and that can support differential synchronization.
3) Upon receiving the summarizing version vector and identifiers from the second server, the first server figures out all of the identifiers of objects which need to be received as whole objects and sent to the second server. The sub-steps for this step are as follows:
   a) Find out all objects which exist in the second server but do not exist in the first server and put their identifiers into the list of objects needed to be received from the second server. This is done by checking if any of the received identifiers of objects matches the identifier of any object existing in the first server.
   b) Find out all objects which exist in both servers that can support differential synchronization. Then check if any of these objects' base version vector is newer than the common version vector of the two servers, where base version vector of an object refers to the version vector of the object absent any differential updates and where the common version vector refers to a version vector reflecting the state from where the two servers' summarizing version vectors diverged. All of the identifiers of the objects which passed the check are also added to the list of objects needed to be received from the second server.
   c) Send all the identifiers obtained from sub-steps a) and b) to the second server.
4) Upon receiving the identifiers from the first server, the second server compares its latest common ancestor version vector with the summarizing version vector of the first server. If the summarizing version vector of the first server is older than the second server's latest common ancestor version vector, it extracts all the individual whole objects it contains. Otherwise, it proceeds to compare its summarizing version vector with the first server's summarizing version vector. If the second server's summarizing version vector is newer than the first server's summarizing version vector, the second server will scan all the objects existing in it. If the identifier of an object appears in the list of identifiers received from the first server, it is sent to the first server as a whole. If an object is the one needed to be sent as a whole because it does not support differential synchronization and its version vector is either newer or conflicting with the first server's summarizing version vector, this object will also be sent to the first server. If an object is the one which supports differential synchronization and its base version vector is newer than the first server's summarizing version vector, this object will be sent to the first server as a whole too. Finally, if an object is the object which supports differential synchronization and has updates which stamps are either newer than or conflicting with the first server's summarizing version vector, these updates will be sent to the first server as the differential updates. The order of all of the objects or updates being sent is determined first by the ordering of version vectors or the associated update stamps. If there is a discrepancy in the ordering, then a secondary ordering process is invoked.
5) After finishing step 4, if the first server is one of the second server's selected servers, the second server will store or update the first server's summarizing version vector it has stored previously. It may also recalculate its latest common ancestor version vector if all of the selected servers' summarizing version vectors have been stored in the second server, and accordingly purges off all the deleted object's information or differential updates whose version vectors or update stamps are older than or equal to the latest common ancestor version vector.
6) Upon receiving each object and update from the second server, the first server updates the information in it as follows:
   a) If the received object or update has a version vector or time stamp older than or equal to the version vector of the corresponding object in the first server, this object or update will be thrown away.
   b) If a whole object was received and its version vector is newer than the version vector of the corresponding object in the first server, the object in the first server will be replaced with the received object, and accordingly the object's version vector and the first server's summarizing version vector will also be updated.
   c) If a whole object was received and its version vector is conflicting with the version vector of the corresponding object in the first server, the two versions of the object will be reconciled by calling a reconcile method on the object in the first server, with the received object as the argument. As the result, a new object will be generated to replace the object in the first server, and accordingly, a new version vector for the new object is generated and the summarizing version vector of the first server is updated.

d) If a differential update was received and its update stamp and the received second server's summarizing version vector indicate it is not yet contained in and was generated after the corresponding object's differential updates in the first server, the received updates will be added to the top of the object's differential updates in the first server. Accordingly, the summarizing version vector of the first server will be updated.

e) If a differential update was received and its update stamp and the received second server's summarizing version vector indicate it is not yet contained in and was not generated after the corresponding object's differential updates in the first server, the differential update(s) in the first server that were generated after the common state of the two servers will be extracted, and both the extracted differential updates and the received differential update will be passed as arguments to the reconcile method on the object in the first server in order to reconcile the conflict between them. As a result, the object in the first server will be replaced with a new object or a new update will be added to the object's differential updates in the first server, and accordingly a new version vector for the new object or the update stamp for the new update will be generated and the summarizing version vector of the first server will be updated.

7) After finishing step 6, if the second server is one of the first server's selected servers, the first server will store or update the second server's summarizing version vector it has stored previously. It may also recalculate its latest common ancestor version vector if all of the selected servers' summarizing version vectors have been stored in the first server, and accordingly purges off all the deleted object's information or differential updates whose version vectors or update stamps are older than or equal to the latest common ancestor version vector.

8) After finishing step 7, the update propagation from the second server to the first server is completed. If a two way update propagation is required then steps 1) to 7) can be repeated by replacing the first server with the second server and vice versa.

As can be seen from the description above, the subject algorithm has two advantages compared with the existing algorithms. First, it can avoid transmitting per-object version vectors from one server to another. Secondly it can transmit the differential updates which are incorporated in one server, but not incorporated in another server. An additional advantage of the subject algorithm is that it offers finer grained synchronization, and is more fault-tolerant.

In summary, a universal system is provided for synchronizing servers which accommodates wide area mobile computing while at the same time making the synchronizing process more efficient. First, the introduction of multiple primary servers with high performance reliable links ensures high data availability and scaleability. Secondly, the introduction of the secondary servers makes the subject system well suited for mobile computing which may use unreliable and expensive links. Moreover, with the control of the synchronization by secondary servers, economical synchronization can be achieved. Further, since some applications do not permit automatic synchronization, user control of synchronization which prevents unintended synchronization is critical.

A second aspect of the subject invention is the use of a summarizing version vector. This summarizing version vector is used to minimize the amount of data transmitted in the synchronization process by avoiding the necessity for exchanging version vectors for individual objects. It can also further reduce data to be transmitted by working with update stamps associated with individual differential updates to permit differential synchronization. A latest common version vector can be constructed from a server's summarizing version vector and the summarizing version vectors of a set of its selected servers, which is used to reduce differential updates on the server. Additionally, the summarizing version vector permits the restart of synchronization from the point of previous failure with data from an unaffected server. It also supports fine grain synchronization by permitting a differential update as the atom of data to be transmitted.

As a significant feature of the subject invention, the system will switch between whole object synchronization and differential synchronization automatically. For instance in memory management it is oftentimes desirable to switch from differential synchronization to whole object synchronization due to the memory intensive nature of differential processing. Also when doing whole object synchronization it may be beneficial to switch to differential synchronization to minimize the data to be transmitted.

Last but not least, the subject system permits a synchronization between different systems because the semantics of the data is separated from the synchronization, making the system universal as to the format of the data.

BRIEF DESCRIPTION OF THE DRAWINGS

These and other features of the subject invention will be better understood with reference to the Detailed Description taken in conjunction with the Drawings, of which.

DETAILED DESCRIPTION

Figure 1:
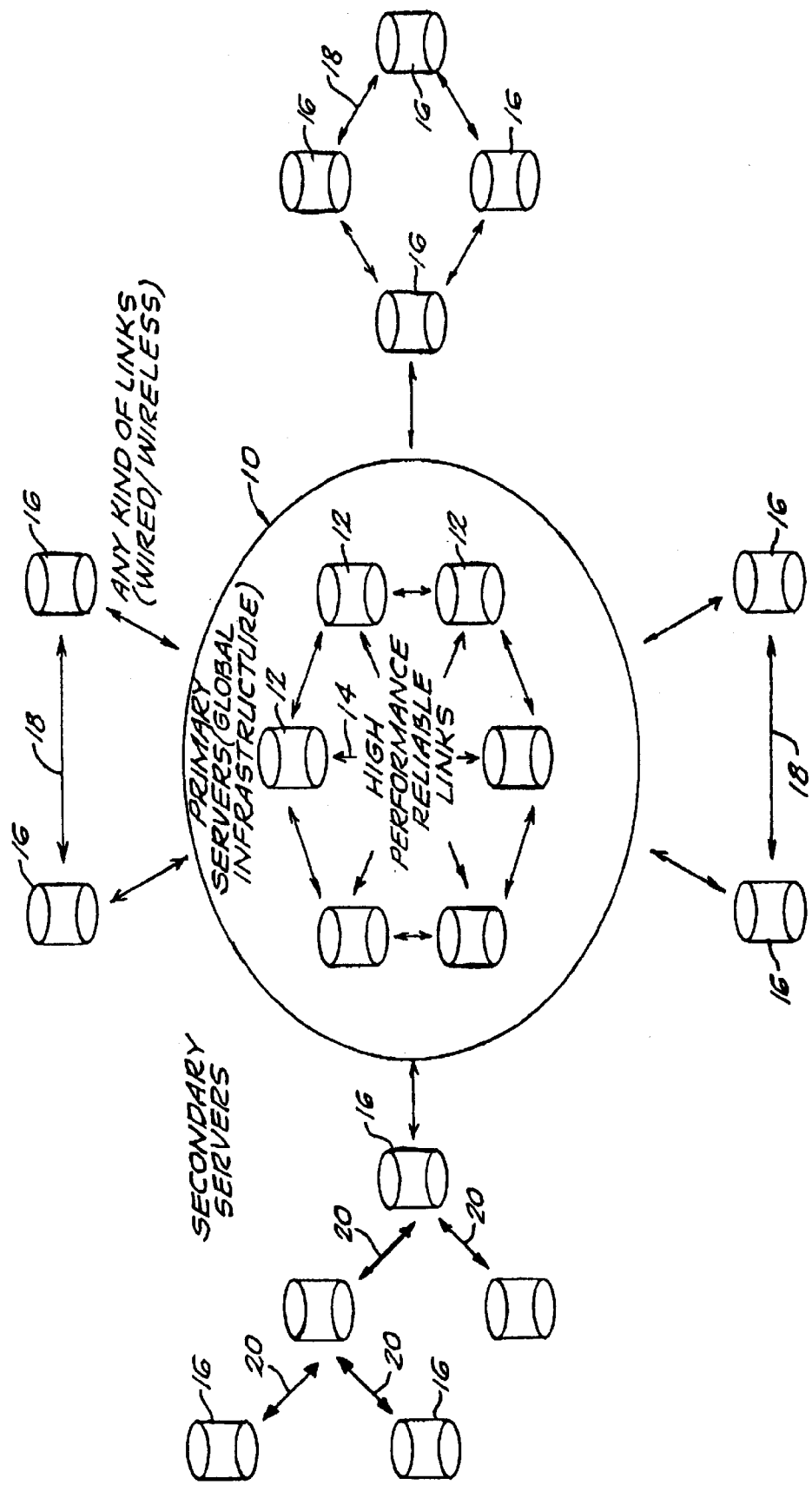
FIG. 1 is a diagrammatic representation of the system architecture of the subject invention illustrating the primary server/secondary server structure.

Referring now to FIG. 1, the system architecture involving primary and secondary servers is illustrated. Here a network 10 of primary servers 12 is interconnected through the utilization of high performance links 14 which are generally orders of magnitude more reliable than wireless links. It is the purpose of the high performance links to ensure synchronization integrity and to permit connection of secondary servers to the primary servers.

As illustrated, a number of secondary servers 16 are either linked to each other as illustrated at 18 in a peer to peer relationship; or are linked as illustrated at 20 in a hierarchical manner. As discussed hereinbefore, it is this primary server/secondary server architecture which permits reliable synchronization with virtually any type of system, be it a peer-to-peer system or a hierarchical system. It will be appreciated that because of the primary server/secondary server architecture, any type of system can be accommodated, thus the subject system can accommodate any topology amongst the secondary servers.

Figure 2:
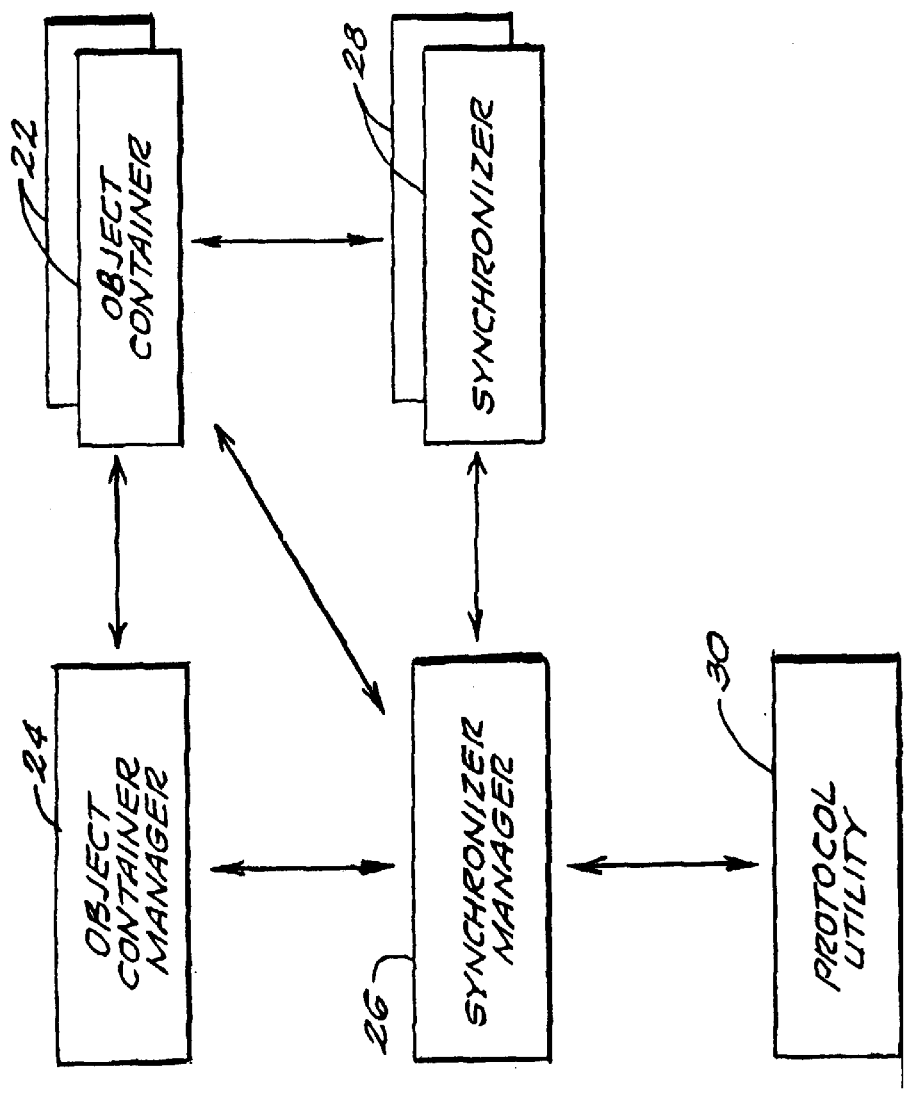
FIG. 2 is a diagrammatic representation of the architecture of the server for the system of FIG. 1 showing an object container manager, a synchronization manager, synchronizers and object containers.

Referring now to FIG. 2, in one embodiment, the architecture of the server of the subject system includes a number of object containers 22 and an object container manager 24 coupled thereto. The object container manager is coupled to a synchronizer manager 26 which is in turn coupled to object containers 22 and synchronizers 28. A protocol utility 30 is driven by synchronizer manager to select the most reliable connection to the network.

In operation, a system utility or application initiates synchronization from either the object container or the synchronizer manager. Synchronizer manager 26 consults with utility 30 to open a reliable connection between two servers to be synchronized. Thereafter, synchronizer manger 26 creates a synchronizer such as synchronizer 28 based on the result from the protocol utility. Then the synchronizers on the two servers will initiate the synchronization process.

Figure 3:
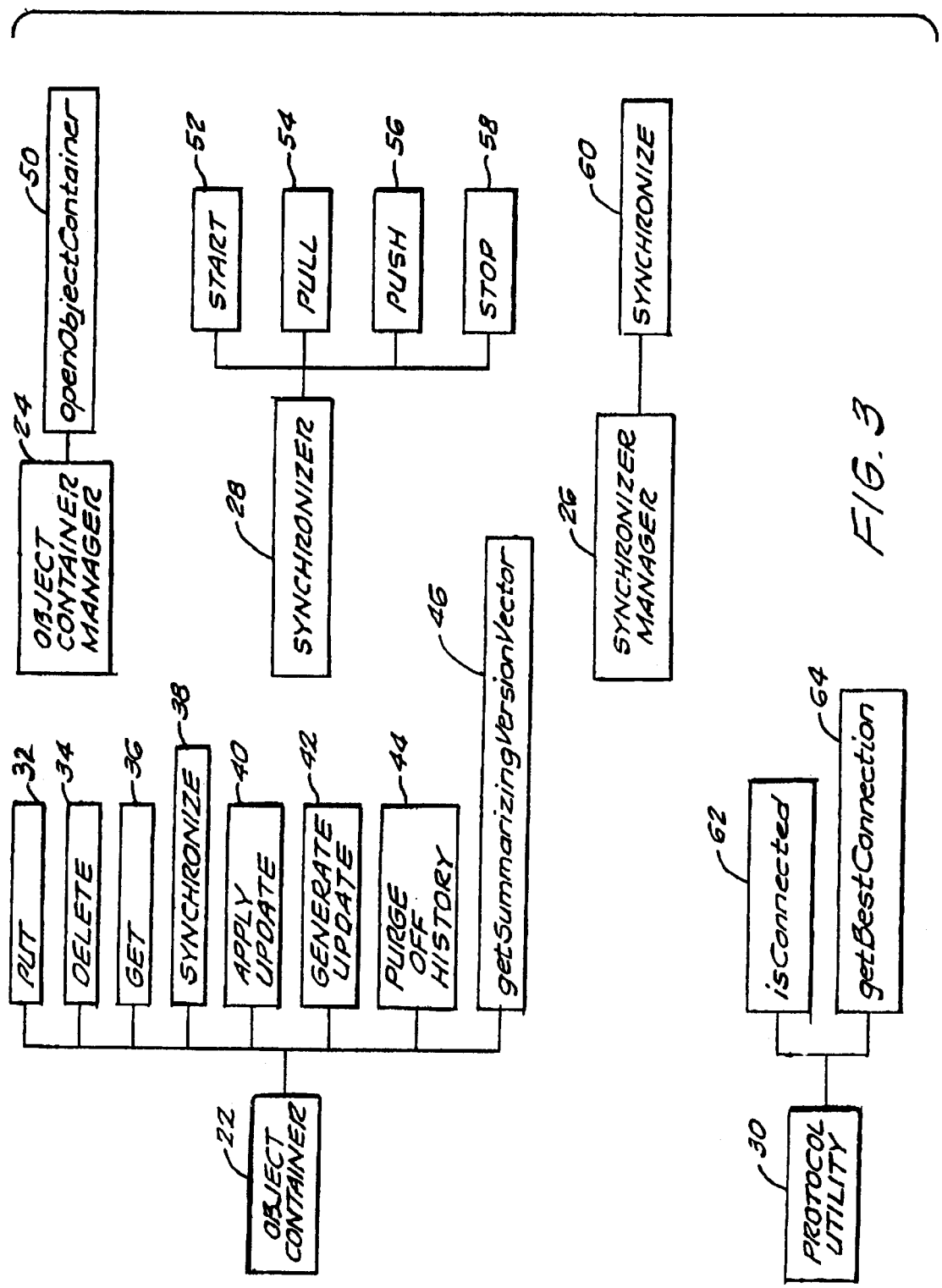
FIG. 3 is a diagrammatic representation of the major subroutines for each of the components shown in FIG. 2.

Referring now to FIG. 3, the subroutines or methods utilized in the system of FIG. 2 are now described. It will be appreciated that object container 22 utilizes a put method 32 a delete method 34, a get method 36, a synchronize method 38, an applyUpdate method 40, a generateUpdates method 42, a purgeOffHistory method 44 and a getSummarizingVersionVector 46. These methods are written in Java and can be found in the source code hereinafter.

As can be seen, object container manager 24 is provided with an openObjectContainer method 50, whereas synchronizer 28 is provided with start method 52, pull method 54, push method 56 and stop method 58, all written in Java and can be found in the source code hereinafter.

Synchronizer manager 26 is provided with a synchronizermethod 60, whereas protocol utility 30 is provided with an isConnected method 62 and a getBestConnection method 64 which are standard.

Figure 4:
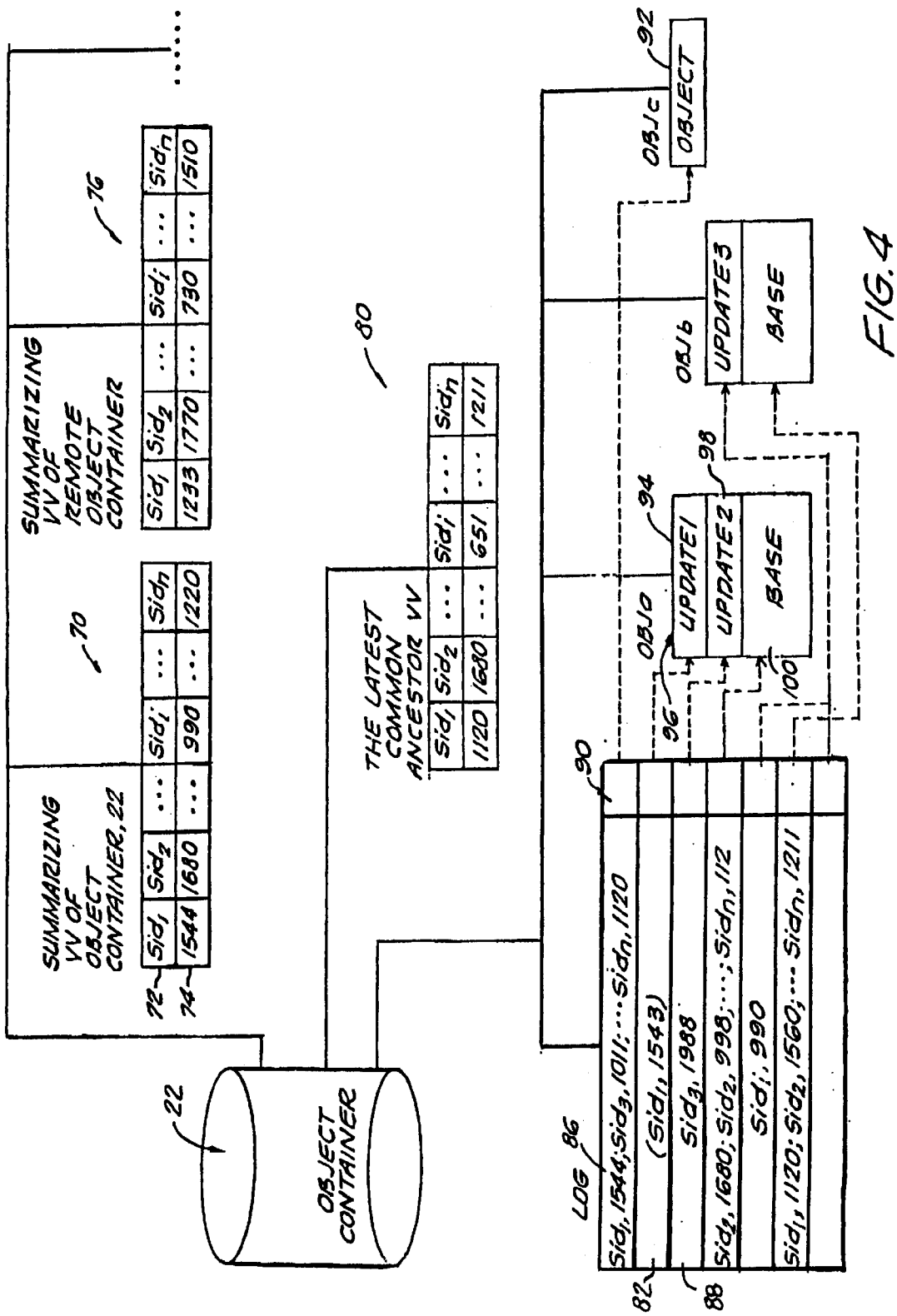
FIG. 4 is a block diagram of the structure of the object container of FIG. 2, showing the summarizing version vector used therein, the latest common ancestor version vector and the structure of the differential based log used in the subject system.

Referring now to FIG. 4, the data structure of the subject system is shown for use with object container 22. Of importance is the structure of the summarizing version vector, here illustrated at 70 which is used throughout the subject invention. As can be seen, the summarizing version vector of object container 22 has a field for identification 72 and a field for a time stamp 74. It will be appreciated that $Sid_1$ refers to object container 1 in the system, whereas the number 1544 refers to a time stamp associated with object container 1. The summarizing version vector in essence contains the identifiers and the time stamps for all of the objects in the respective containers. As shown at 80, a similar summarizing version vector for a remote object container is shown at 76. It will thus be appreciated that there are summarizing version vectors at a number of locations throughout the system.

As illustrated at 80 there is a specialized version vector called the latest common ancestor version vector which serves to identify that differential updates which can be read off of the object container because a set of remote object containers predefined or preselected containers which already have received common differential updates. This permits purging off of certain updates because they are already stored in the predefined set of object containers.

As illustrated at 82, a log structure is shown which contains the history of updates to the object container 22. As can be seen, the log contains a field 84 having a reference to either the object version vector 86 or to the update stamps 88, and a field 90 having a reference to the corresponding object 92 or differential update 94. It will be appreciated that object 96 associated with update 94 contains an additional update 98, both of which have updated the initial object, here illustrated as base 100.

Object 92 is the object which must always be sent as a whole object, whereas Object 96 can be in terms of differential updates to a base.

Figure 5:
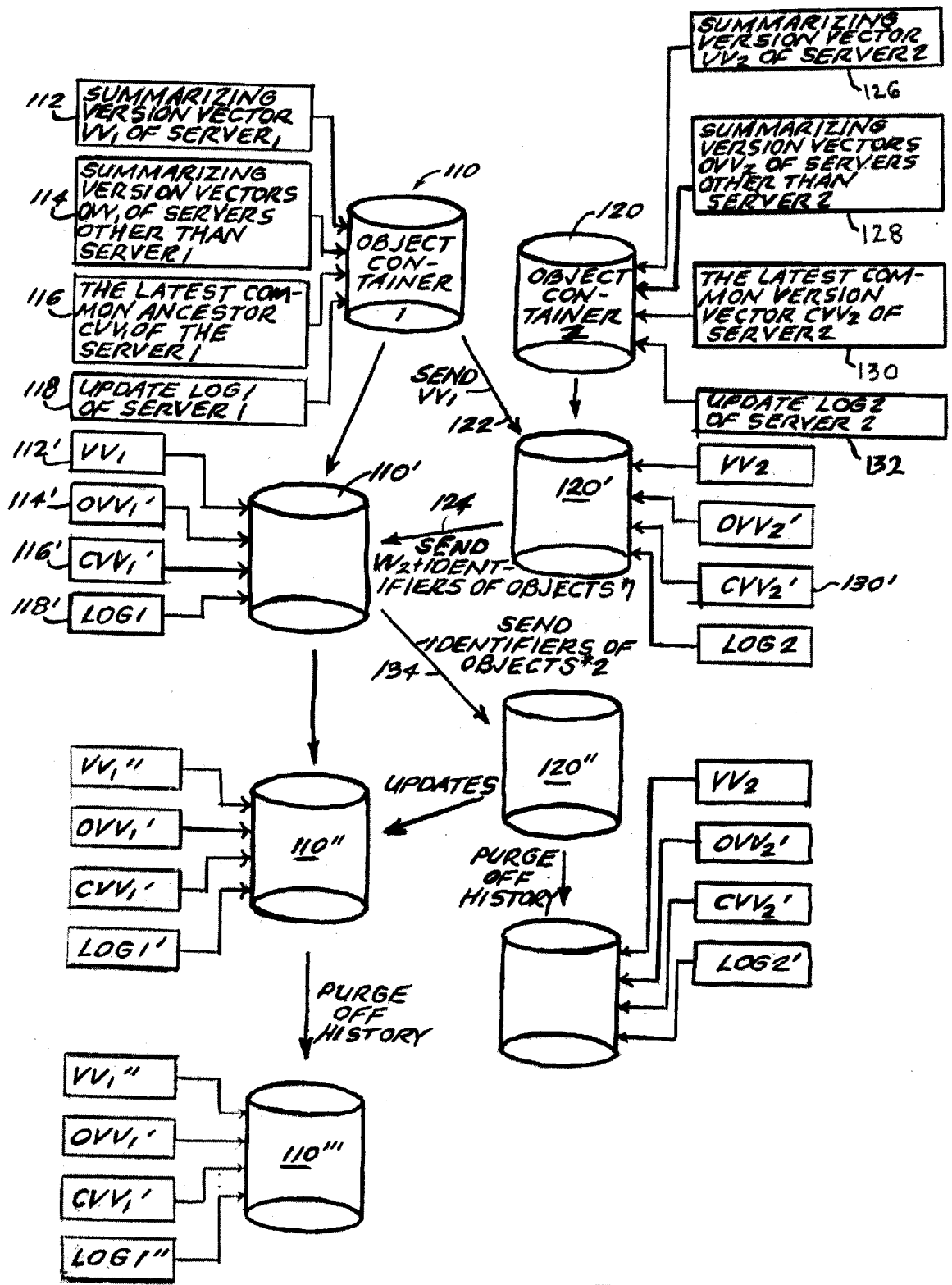
FIG. 5 is a diagrammatic representation of the synchronization of two servers illustrating the utilization of summarizing version vectors.

Referring now to FIG. 5, what is shown is a system to permit the change of data in the object container during synchronization. As can be seen, an object container 1, here illustrated at 110 is provided with summarizing version vector $VV_1$ of server 1 as illustrated at 112. Also provided to object container 110 are summarizing version vectors $OVV_1$ of servers other than server 1, here illustrated at 114. The latest common ancestor version vector, $CVV_1$ of server 1 as illustrated at 116 is also supplied to object container 110. Likewise, update log 1 of server 1 as illustrated at 118 is also applied to object container 110.

Object container 110' illustrates a dynamically changing state for object container 110 having the indicated inputs, 112'–118'. The dynamically changing state of object container 110 occurs as a result of object container 120 having been dynamically changed as illustrated at 120' which sends data to object container 110 as illustrated by arrow 120. It will be appreciated that the synchronization process starts by object container 110 sending summarizing version vector 1 as illustrated at arrow 122 to the server associated with object container 2, here illustrated at 120. Object container 120 is changed so that it contains synchronizing information supplied by summarizing version vector 1 so that it in turn updates object container 110 throughout information sent as illustrated by arrow 124.

As will be appreciated, object container 120 has as inputs the summarizing version vector VV2 of server 2 illustrated at 126, the summarizing version vectors of OVV2 of servers other than server 2 as illustrated at 128, the latest version vector of CVV2 of server 2 as illustrated at 130 an update log 2 of server 2 as illustrated at 132.

The information sent, as illustrated by arrow 122, is the summarizing version vector 2, plus identifier of objects in object container 120 which support differential synchronization.

The synchronization continues as illustrated by arrow 134, with information going from object container 110' to object container 120". The information transmitted as illustrated by arrow 134 are identifiers of objects which supports differential synchronization absent the objects of container 1, but which objects exist in object container 2. This can be ascertained by comparing the received identifiers of objects from object container 120' as illustrated by arrow 124 with the identifiers of objects in object container 1. Note that the summarizing version vector is not sent at this point because it has been previously sent in the first stage of the synchronization process.

With the transmission of information as illustrated by arrow 124, it is possible for object container 120" to be purged off information which is stale. The purging off of historically stale information is accomplished by access to the latest common version vector CVV2', here illustrated at 130'.

Thereafter, updates are sent from object container 120" to object container 110" at which point, a purging operation can take place. After all of the purging operations take place, the synchronization is completed such that object container 110'" will contain the most updated version of all of the objects in the system. It will be appreciated that the objects in object container 120 can be synchronized and updated in the same manner.

Figure 6:
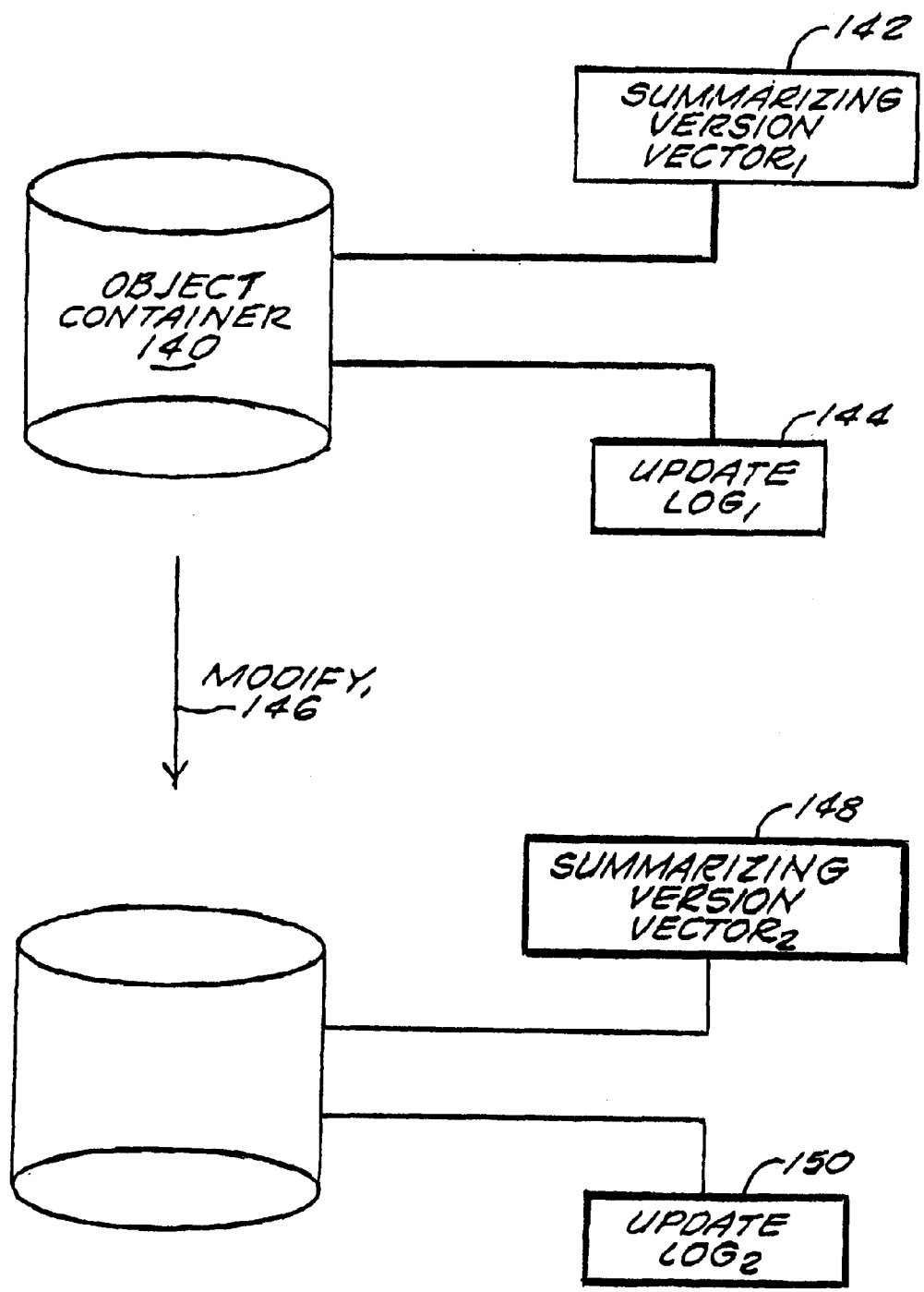
FIG. 6 is a block diagram illustrating a process for modifying objects in an object container.

Referring now to FIG. 6, what is illustrated is a system for modifying an object in an object container. Here, an object container 140 is supplied with a summarizing version vector 142 and an update log 144. The modification step, as illustrated at 146, requires the input of a different summarizing version vector, here illustrated at 148, along with its associated update log, here illustrated at 150. What this diagram illustrates is that if an object container 140 is modified, then it is necessary to modify the corresponding summarizing version vector and its corresponding update log in order to record a modification.

Figure 7:
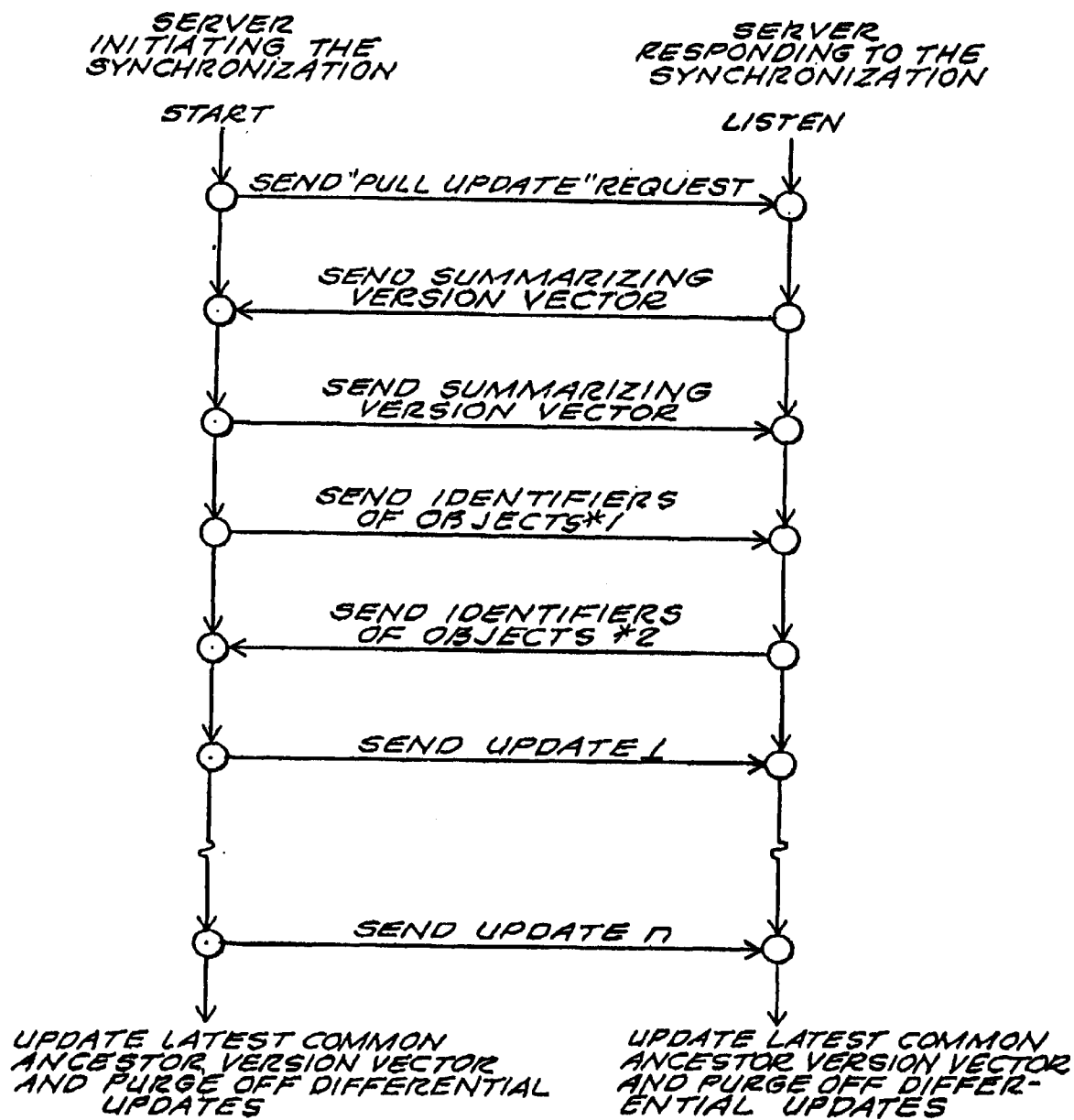
FIG. 7 is a diagrammatic representation of a synchronization protocol showing the exchange of data between first and second servers.

Referring now to FIG. 7, what is illustrated is a synchronization protocol. The synchronization protocol involves two synchronizers with one as the synchronization initiator and another as a synchronization responder. The synchronizer initiating the synchronization first sends a pull/push request to the synchronization responding to the synchronization which is ready to listen to the synchronization initiator. Thereafter, this responding server sends a summarizing version vector back. Then a further summarizing version vector is transmitted in the opposite direction along with identifiers of objects which support differential synchronization. Next, identifiers of objects are sent back in the opposite direction coming with the result being the sending and update to the server responding to the initial synchronization request.

The result of the synchronization protocol is that the server initiating the synchronization is provided with an update corresponding to the latest common ancestor version vector, with all differential updates purged off. The same is true for the server responding to the synchronization request.

Figure 8:
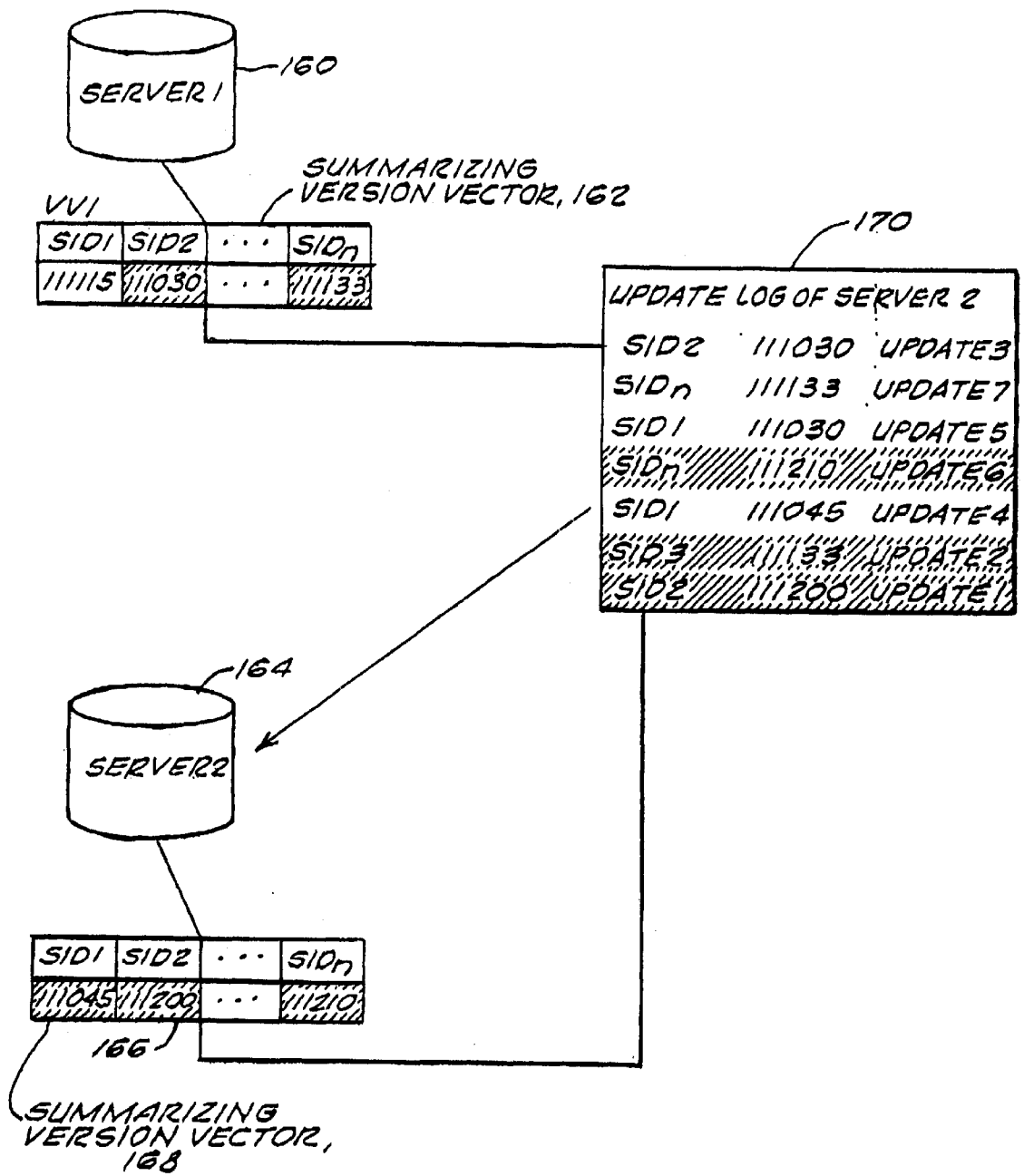
FIG. 8 is a block diagram of the system for extracting updates to be transmitted from a first server to a second server utilizing summarizing version vectors and a differential update log for the second server.

Referring now to FIG. 8, what is described is a method for extracting updates to be transmitted. Here, a server 160 has an associated summarizing version vector 162 which contains the aforementioned fields 72 and 74. The highlighted field indicates a time stamp which is earlier in time than the corresponding value in the summarizing version vector of a second server, server 164. This is illustrated by highlighted portion 166 of summarizing version vector 168 associated with server 164.

The updates are extracted by checking the version vectors or update stamps in the update log 170 of server 164. Note these version vectors or update stamps are the ones found at 86 in FIG. 4. The checking process is accomplished in one embodiment as follows: Any object or differential update with a version vector or update stamp that includes at least one time stamp greater than the highlighted corresponding time stamp in summarizing version vector 162 and less than or equal to the highlighted corresponding time stamp in summarizing version vector 168 is extracted.

Figure 9:
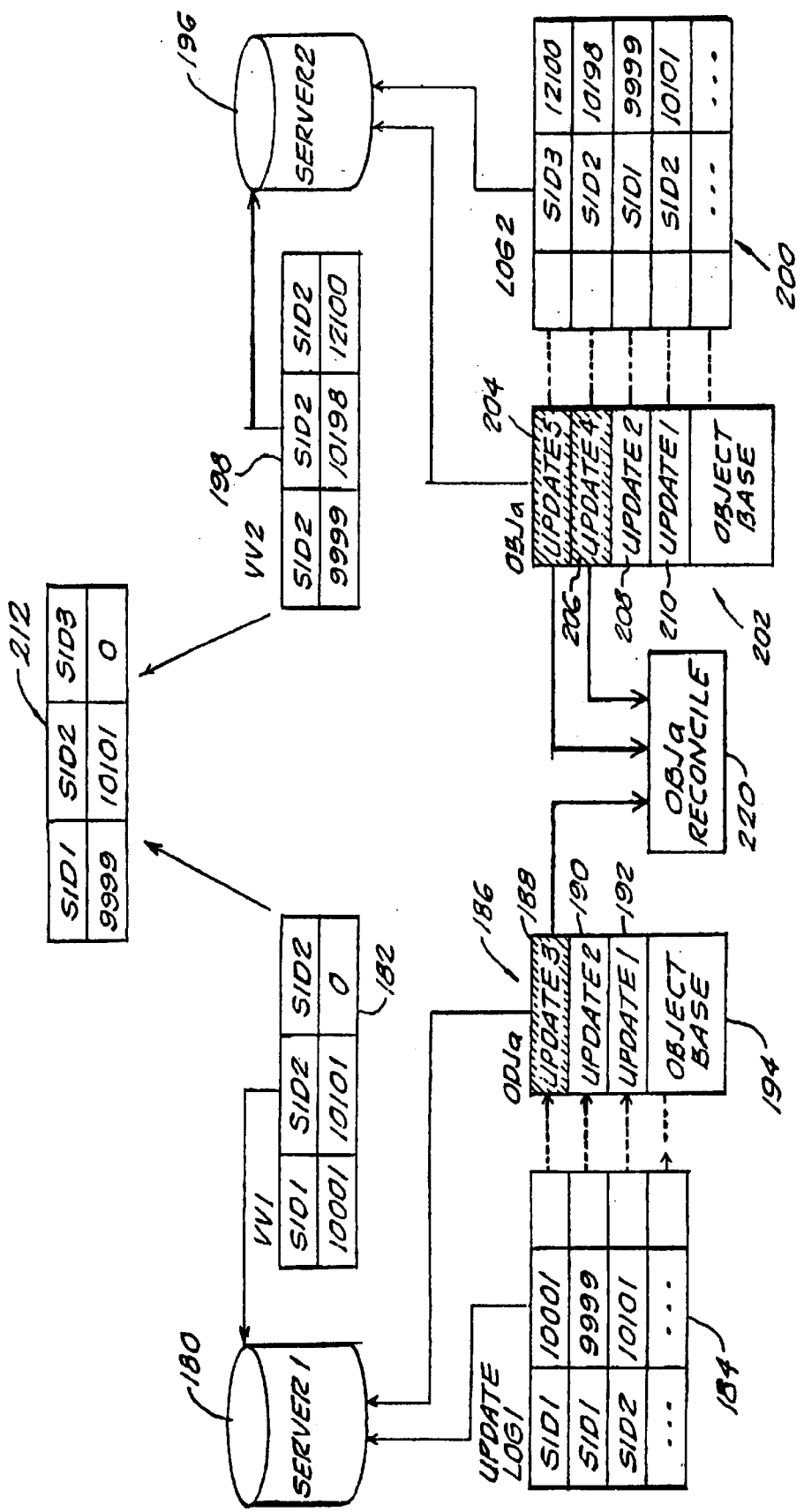
FIG. 9 is a block diagram showing a process for detecting and resolving conflicts between two servers.

Referring to FIG. 9, a method for detecting and resolving conflicts is shown in which a server 180 has a corresponding summarizing version vector . An update log 184 is coupled to server 180 and contains an object 186 which contains three differential updates 188, 190 and 192 on top of its base 194. As to the second server, server 196, this server is provided with a summarizing version vector 198 and a corresponding update log 200, Server 196 contains an object 202 which is the same as object 186, with the exception that it has different differential updates indicating a conflict with 186. This is shown by comparing the highlighted portions 204 and 206 with highlighted portion 188. The problem is how to figure out why updates 204 and 206 are in conflict with update 186. This conflict detection is accomplished by comparing the version vectors or update stamps of the whole object, not shown in this figure, or the differential updates 188, 190, 192 in the server 180 and the differential updates 204, 206, 208, 210 in server 196 with the common version vector 212 of the summarizing version vector 182 and 198. The common version vector of the two summarizing version vectors reflects a common state for the two servers. If there are differential update(s) of objects 186 and 202 in both the servers 180 and 196 that have a time stamp greater than the corresponding time stamp in the common version vector 212, then two objects 186 and 202 are in conflict.

After the objects 186 and 202 have been found to be in conflict, the conflict is resolved or reconciled by calling a predetermined reconcile method and passing the differential updates in conflict to the method as shown at 220. It will be noted that the reconcile method is usually determined based on a specific application.

Figure 10:
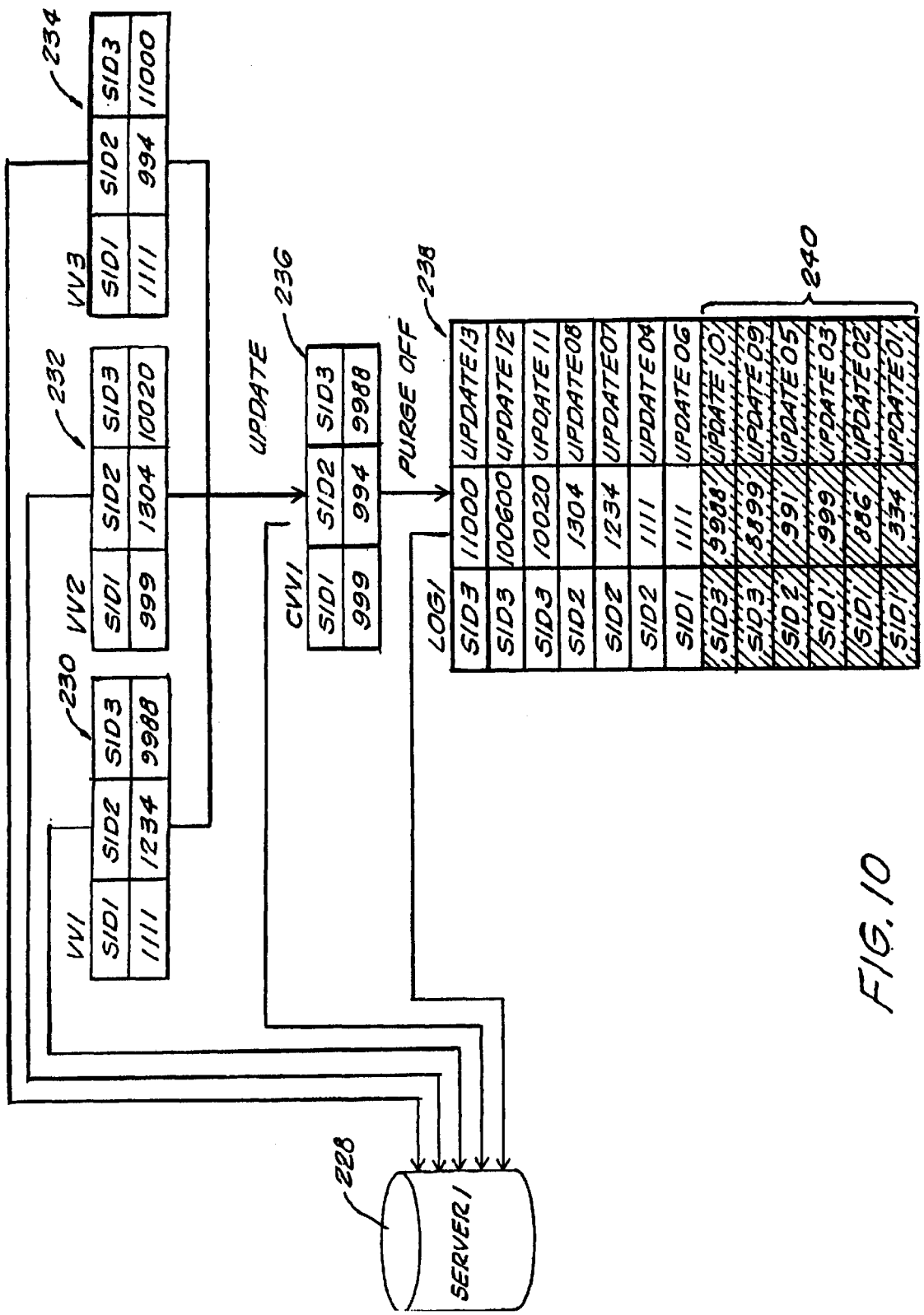
FIG. 10 is a block diagram showing a process for the purging off of update logs at a server; and, FIG. 11 is a block diagram illustrating the switching of the synchronization system from a whole object synchronization process to a differential synchronization process based on predetermined characteristics of the system.

Referring now to FIG. 10, one method of a purging off update logs is shown. Here, a server 260 has a summarizing version vector of itself, illustrated at 260, and the summarizing version vectors 262 and 260 from other servers. The latest common version vector 266 of the server 230 is calculated from all the three summarizing version vectors 230, 232, and 234 which represents the common state of all three servers. Having obtained the latest common version vector 236, it is possible to purge off the corresponding update log entries in the update log 238. This means that log entries bracketed by bracket 240 may be deleted or purged. This is because these updates have an update stamp which is older than the latest common version vector 236, reflecting the fact that these updates have already been incorporated in all the above three servers.

Figure 11:
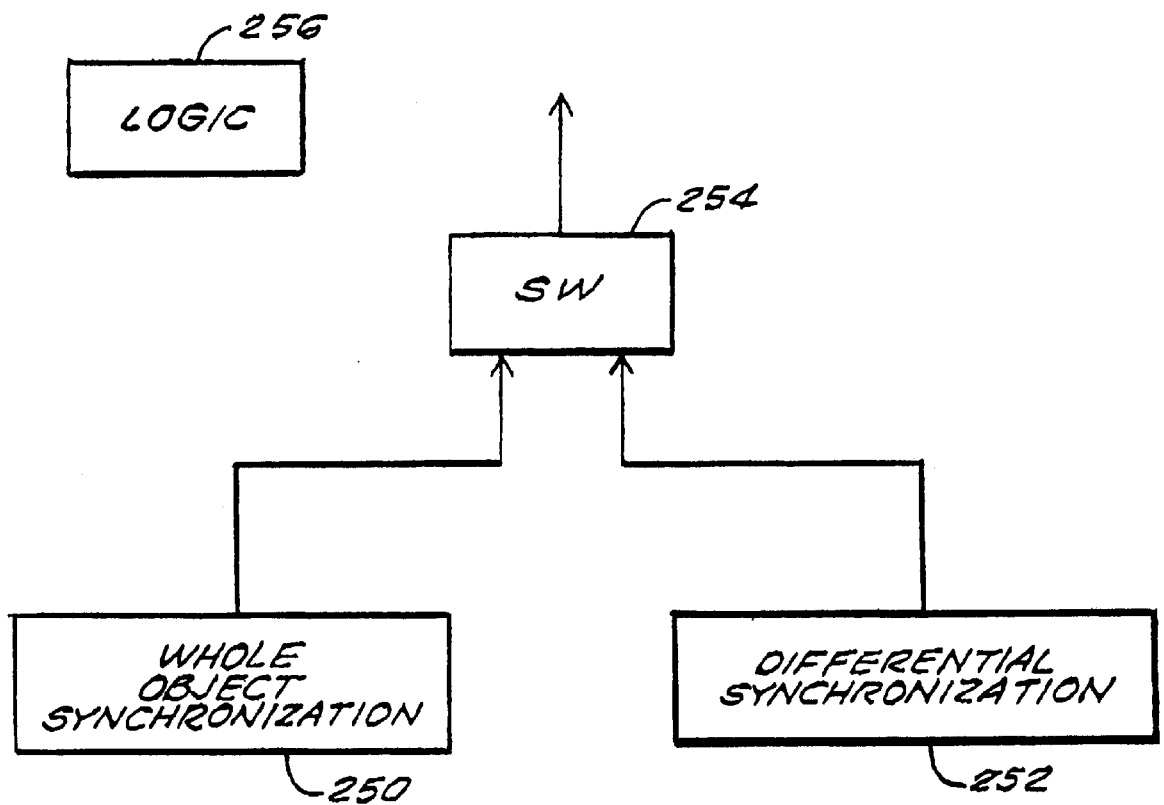

Referring now to FIG. 11, it is possible to switch between whole object synchronization and differential synchronization. Here, whole object synchronization is shown at 150, whereas differential synchronization is shown at 152. A switch 254 is used to determine which synchronization process will be used. Switch 254 is under the control of logic 256 which operates as follows.

In one embodiment, whether an object which can support differential synchronization will be synchronized by sending it as a whole object or the portion of its differential updates is determined by the following logic. First, if the object only exists in a first server and is absent from a second server, then the whole object needs to be sent from the first server to the second server when the two servers synchronize with each other. Secondly, if the object exists in the two servers and if at least at one server the state of the base of the object is newer than the common state of the object at the two servers, then no differential synchronization on the object can be done between the two servers because the object at either of the two servers can not be synchronized up-to-date after receiving only differential updates from the other server. This requires switching to whole object synchronization. Otherwise, differential updates can be realized between the two servers, and the system can be switched to differential synchronization.

Other factors, if needed, can be added to the logic for the switch between whole object synchronization and differential synchronization, For instance, a switch from differential synchronization to whole object synchronization may be triggered if the free space of memory is close to being exhausted, or if it is found to be more efficient to send a whole object other than its differential updates. Alternatively, a switch from whole object synchronization to differential synchronization can be determined to minimize the data to be transmitted. In other words, it may be desirable to switch to differential synchronization when it is more efficient to send an object's differential updates as opposed to the whole object. Note that the switch between whole object synchronization and differential synchronization is determined on the basis of individual objects.

More particularly, the data in the subject system can be files, documents, databases or the mix of part or all of these and they will be appropriately ground. The way data are grouped can change from application to application. For example, in file systems, a directory can be considered as a file group and it may further define structures inside to organize data (files). In object oriented databases, a data group possibly includes all the homogeneous or heterogeneous objects needed to meaningfully support its applications. As the first step, we assume that all the data groups in different devices, which need to be synchronized with each other, eventually contain exactly the same data set.

The subject system has been implemented using Java. Therefore, all descriptions below are based on Java's terminology. An object container is a container which stores and maintains a Java object group. Objects in the object container are represented by Synchronizable objects which are any Java Serializable objects providing a replace/apply method and a reconcile method. Synchronizable objects are the abstraction of concrete data such as files, documents, or rows of database tables. Assuming that a full set of (Synchronizable) objects already exist in an object container, applications can then access objects in the object container by calling its get or put methods.

In a server, multiple object containers can be created by calling the object container manager's openObjectContainer method. In each server, only one object container manager can exist and is used to manage all the object containers at the server. In addition to creating object containers, it also offers services such as listing or deleting the created object containers. For convenience, each object container will be assigned a globally unique identifier when created which can be used when referencing that object container in the subject system. In one embodiment, the object container identifiers can be assigned to the hash codes which are generated by a one-way hash function with the URLs of the object containers as the input to it.

Synchronizers are the key component in the subject system in order to bring any two object containers into a consistent state. There can be multiple synchronizers in each server, where each of the synchronizers uses a different type of communications transport and protocol. For example, synchronizer 1 may use TCP/IP and a two-way synchronization protocol while synchronizer 2 may use infrared and a one-way protocol which is more suited for unreliable wireless communications. A synchronizer is dynamically created by the synchronizer manager when needed and will be self-destroyed just after it has finished the synchronization. The synchronizer manager in a server can either bind an object container which is going to be synchronized with a synchronizer and trig the synchronizer to start the synchronization, or listen to one or more synchronization requests from the synchronizer managers at remote servers. The protocol utility can help the synchronizer manager adaptively select a synchronizer to be generated that matches the best connection available currently. The protocol utility is one of the classes provided by the Java extension package.

As can be seen from the above description, the object semantics, such the format it uses to represent its contents and the algorithms it uses to reconcile concurrent update conflicts, is separated from the synchronizer. This feature leads to the ability that the subject system may synchronize between different application systems.

Assume server 1 is specified to synchronize the object container 1 at it with the object container 2 at the server 2. Further, assume all the components bundled to object container i (i=1,2) are annotated as synchronizer manager i, synchronizer i, etc. The detailed steps for the whole synchronization process are as follows:

1) Synchronizer manager 1 opens a communication channel to connect to the synchronizer manager 2 which has been listening to synchronization requests.
2) Synchronizer manager 1 sends the synchronization request to synchronizer manager 2 which indicates the object container to be synchronized with and the synchronizer to be used in the synchronization.
3) Synchronizer manager 1 and 2 create and connect the pair of matching synchronizers 1 and 2 with synchronizer 1 as the synchronization initiator and synchronizer 2 as the listener.
4) Synchronizer 1 sends a pull or push update command to synchronizer 2. The pull update command means that object container 1 requires the receipt of updates from object container 2, whereas the push update command means that object container 1 will propagate updates from it to object container 2. Whether synchronizer 1 should send the pull or push update command or both in a serialized manner is determined by the system utility or application which initiated the synchronization. The following steps assume that synchronizer 1 sent a push update command to synchronizer 2. When synchronizer 1 has sent a pull update command to synchronizer 2, synchronizer 2 sends a confirmation message back to synchronizer 1 and the rest of the steps will be the mirror image of the foregoing steps.
5) Synchronizer 1 obtains the summarizing version vector of object container 1 by calling the getSummarizingVersionVector method as shown in FIG. 3 on object container 1, and sends the summarizing version vector to synchronizer 2. The summarizing version vector of object container 1 reflects the current state of object container 1.

6) Synchronizer 2, when needed, records the received summarizing version vector of object container 1 in object container 2. Synchronizer 2 then obtains the summarizing version vector of object container 2 and the identifiers of objects in object container 2 that support differential synchronization by calling the getSummarizingVersionVector method which is shown in FIG. 3 and by calling the entries method described in the source code presented hereinafter on object container 2. The summarizing version vector of object container 2 reflects the current state of object container 2. Synchronizer 2 then sends the summarizing version vector and identifiers obtained above to synchronizer 1.

7) Synchronizer 1, when needed, records the received summarizing version vector of object container 2 in object container 1. Synchronizer 1 then obtains the identifiers of the objects which have to be received as a whole object by calling the getWholeObjectIds method described in the source code presented hereinafter on object container 1 with the received summarizing version vector of object container 2 and the received identifiers as the arguments. The identifiers obtained above include the identifiers of objects which exist in object container 2 but miss from object container 1 and the objects the state of the base of which are newer than the common state of object container 1 and object container 2 Synchronizer 1 then sends the identifiers obtained above to synchronizer 2.

8) Synchronizer 2 obtains the updates which have to be sent to object container 1 by calling the generateUpdates method as shown in FIG. 3 on object container 2 with the received identifiers of objects and the summarizing version vector of object container 1 received in step 6 as arguments. Each of the updates obtained above may be a whole object with its version vector or a differential update with its update stamp. Synchronizer 2 then sends the updates obtained above to synchronizer 1 one by one.

9) Synchronizer 1 applies each of the received updates to object container 1 by calling the applyupdate method as shown in FIG. 3 on object container 1.

10) After finishing the sending or receiving updates, both synchronizers 1 and 2 may call the purgeOffIistory method as shown in FIG. 3 on object container 1 and object container 2, respectively, in order to purge off the differential updates which have been contained in all the object containers object container 1 or object container 2 is concerned with.

The applyUpdate method of an object container will further call one of the methods defined in an object in order to replace an object with the received object, reconcile between an object with the received object, add the received differential update to an object, or reconcile the received differential update with the differential update(s) of an object which are in conflict with the received differential update. It will also update the summarizing version vector of the object container to reflect the fact that the object container has already placed the update into it.

As can be seen from the description above. The summarizing version vector deployed in the subject system is not only used for the detection of concurrent update conflicts, but also for reducing the number of entries in an update log.

The summarizing version vector of an object container is in effect the summary of the version vectors of all the objects and the update stamps of all the differential updates in the object container. For an object which cannot support differential synchronization, the version vector of the object reflects the current state of the whole object, whereas for an object which can support differential synchronization, the version vector of the object reflects the current state of the base of the object, absent all the differential updates associated with it. Much like the version vector for a whole object, the version vector for the base of an object also dynamically changes as part or all of the differential updates associated with it are purged off. Therefore, the version vector of an object characterizes the current state of the whole object or the base of the object.

The summarizing version vector of an object container or the version vector of an object is the vector of update stamps. An update stamp in turn consists of two fields: the first field is the identifier of an object container which has made modification(s) to an object if this is the version vector of the object or to object(s) in an object container if this is the summarizing version vector of the object container; the second field is the time stamp generated by the modifying object container corresponding to the first field when it made the last modification to the object or objects. For convenience, an update stamp is represented by $(sid_i, t_i)$ where $sid_i$ is the first field of the update stamp, and $t_i$ is the second field of the update stamp. The time stamp in an update stamp can be real time, an update sequence number, or whatever is meaningful to the application. A series of time stamps generated by an object container must be consistent in meaning and strictly monotonic while different object containers may have different semantics with the time stamps they generate. This is very important when synchronizing between object containers across different application systems because it is impractical to require different application systems generating time stamps with the same semantics.

Using the update stamp representation above, the summarizing version vector of an object container or the version vector of an object can be represented as $\{(sid_1, t_1), \ldots, (sid_1, t_i), \ldots, (sid_n, t_n)\}$ or $\{(sid_i, t_i)|i=1, 2, \ldots, n\}$. The semantics of the summarizing version vector of an object container and the version vector of an object are similar, except that the version vector of an object only reflects that object's current state in its containing object container other that the current state of the containing object container. Due to the similarity, only the summarizing version vector will be described in detail in the following. The version vectors of objects will be mentioned only when needed.

The i-th component of the summarizing version vector of an object container means that the object container has contained all modifications made by the object container with the identifier $sid_i$ up until the time indicated by the time stamp $t_i$. For convenience, the summarizing version vector of object container j will be represented as $vv^j$, and its i-th update stamp as $vv_i^j$.

The size n of the summarizing version vector $vv^j$ of object container j means that object container j-th has contained all the modifications to the objects in it made by the object containers with the identifiers $sid_1, sid_2, \ldots, sid_n$ up until the time stamps $t_1, t_2, \ldots t_n$, respectively. Based on the descriptions above, several functions/propositions are defined/proved below in order to make it possible to compare the state of two entities by utilizing summarizing version vectors, version vectors, and update stamps. An entity hereinafter represents an object container, an object, or a differential update.

Definition: z=y.getTime(x) is a function which returns the time stamp z in y that corresponds to the object container with the identifier x, y represents the summarizing version vector of an object container, the version vector of an object or the update stamp of a differential update. If x does not appear in y, then the returned time stamp z is 0.

Definition: Let $y_1$ and $y_2$ are either the summarizing version vector of an object container, the version vector of an object or the update stamp of a differential update. $y_1$ is equal to $y_2$ if $y_1$.getTime(x)=$y_2$.getTime(x) for any object container's identifier in $y_1$ and $y_2$. $y_1$ is newer than $y_2$ if $y_1$ is not equal to $y_2$ and $y_1$.getTime(x)>=$y_2$.getTime(x) for any object container's identifier in $y_1$ and $y_2$. $y_1$ is older than $y_2$ if $y_1$ is not equal to $y_2$ and $y_1$.getTime(x)<=$y_2$.getTime(x) for any object container's identifier in $y_1$ and $y_2$. $y_1$ conflicts with $y_2$ if $y_1$ is neither equal to $y_2$, nor newer than $y_2$, nor older than $y_2$.

Proposition: Let $e_1$ and $e_2$ represent either an object container, an object, the base of an object, or a differential update and $y_1$ and $y_2$ are the summarizing version vector, the version vector, or the update stamp of $e_1$ and $e_2$, respectively. $e_1$ has the current state same as or consist with $e_2$'s if $y_1$ is equal to $y_2$. $e_1$ has the current state newer than $e_2$'s if $y_1$ is newer than $y_2$. $e_1$ has the current state older than $e_2$'s if $y_1$ is older than $y_2$. $e_1$ has the current state conflicting with $e_2$'s if $y_1$ is conflicting with $y_2$.

Prove: By definition, if $y_1$ is equal to $y_2$, then any update contained in $e_1$ is also contained in $e_2$ and vice versa. So obviously $e_1$ has the current state same as $e_2$ if yl is equal to $y_2$. Next assume that $y_1$ is newer than $y_2$ and the current state of $e_1$ is not newer than $e_2$'s. By definition, if $y_1$ is newer than $y_2$, then $e_1$ must contain updates which are not contained in $e_2$ and any update contained in $e_2$ must have been propagated into $e_1$. So the assumption does not hold. The other part of the proposition can be proved similarly. (Prove ends.)

Definition: Let $y_1$ and $y_2$ be the summarizing version vectors of object containers $e_1$ and $e_2$, respectively. $r_y$ is called the common version vector of $y_1$ and $y_2$ if and only if $r_y$ contains only the identifiers of object containers that exist in both $y_1$ and $y_2$ and the time stamp in $r_y$ corresponding to each of such identifiers is the smaller of the corresponding time stamps in $y_1$ and $y_2$.

Proposition: Let $e_1$ and $e_2$ be two different object containers and $y_1$ and $y_2$ be the summarizing version vectors of $y_1$ and $y_2$, respectively. Further, let $r_y$ be the common version vector of $y_1$ and $y_2$. $r_y$ then represents the state from which $e_1$ and $e_2$ diverged.

Prove: By definition of $y_1$ and $y_2$, if an update has been contained in both $e_1$ and $e_2$, then it must be reflected in both $y_1$ and $y_2$, and therefore the time stamp associated with the update must be equal or less than the corresponding time stamps in $y_1$ and $y_2$. In other words, the time stamp associated with the update is equal to or less than to the smaller of the two corresponding time stamps in $y_1$ and $y_2$. By definition of the common version vector, the update is reflected in $r_y$.

If an update is only contained in either $e_1$ or $e_2$, then the time stamp associated with the update must be greater than the corresponding time stamp in the summarizing version vector of the other object container. Therefore, the update can not have been reflected by the summarizing version vector of the object container absent it. By the definition of the common version vector, the update also can not have been reflected by $r_y$. (Prove ends.)

It is appreciated that whenever a modification to an object is made to an object container, that modification will be reflected into the object container by calling the put method as shown in FIG. 3 on the object container. The put method will in turn cause the object container to update its summarizing version vector, update the version vector of the object to be modified or generate an update stamp associated with the differential update to be added, and add the reference to the modified object or added differential update and the reference to the corresponding version vector or update stamp to the update log of the object container. The update stamp of a differential update means that the differential update was generated by the object container with the identifier shown in the first field of the update stamp at the time shown in the second time stamp in the update stamp.

Based on the description above, it is realizable to figure out the difference of an object container from another, detect concurrent update conflicts between two object containers, and reduce the number of entries in update logs. Let $I_s$ denote object container i that is going to pull updates from another object container j denoted as $R_s$. The concrete algorithms for the computation mentioned above are as follows.

Difference Computing—Assume $R_s$ which has the summarizing version vector $svv^j$ has received the summarizing version vector $svv^i$ of $I_s$ and the identifiers $E^i$ of the objects which need to be sent to $I_s$ as whole objects. Then the common version vector $rvv^{ij}$ of $svv^i$ and $svv^j$ can be calculated based on the definition above and all the updates need to be sent to $I_s$ are determined as follows.

First for any object which does not support differential synchronization, the version vector of the object is checked. The whole object will be sent as an update to $I_s$ if its version vector is newer than $rvv^{ij}$. Let U1 be the group of updates obtained by the above computing.

Secondly, for any object which supports differential synchronization, the version vector of the base of the object is checked. The whole object will be sent as an update to $I_s$ if its base version vector is newer than $rvv^{ij}$. Let U2 be the group of updates obtained by the above computing.

Next, for any object which supports differential synchronization, if there are differential updates applied to it, then the update stamp of each of the differential updates is checked. The whole object will be sent as an update to $I_s$ if the update stamp of any such differential update of the object is newer than or conflicting with $rvv^{ij}$ and the identifier of the object is contained in $E^i$, or any differential update of the object will be sent as an update to $I_s$ if the update stamp of the differential update is newer than or conflicting with $rvv^{ij}$. Let U3 be the group of updates obtained by the above computing.

Finally, let U be the union of U1, U2 and U3. The order of all updates in U is so that if an update whose version vector or update stamp is newer than another than the version vector or update stamp of another update then the first update is before the second update. If two updates in U have conflicting version vectors or update stamps, then if the two updates are differential updates the order between the two updates must be consistent with the order of them in the update log of $R_s$, otherwise if let v1 and v2 be the version vectors or update stamps of the two updates, respectively, the two updates will be ordered as follows.

Sequentially pick up an identifier sli of object container in v1 from the beginning toward the end and examine the conditions described in the following until having found an sli which meets one of the conditions. If there exists a sli such that v1.getTime(sli)>v2.getTime(sli) then put the update with v1 before the update with v2. If there exists a sli such that v1.getTime(sli)<v2.getTime(sli) then put the update with v1 after the update with v2. One of the condition will be finally met because no two version vectors in the same object container will be the same because of the monotonic feature of the time stamps generated by the same object container.

U is then the set of updates representing the difference of $I_s$ from $R_s$ which will be sent to $I_s$.

Concurrent Conflict Detection—The detection of concurrent update conflicts between two objects, belonging to $I_s$ and $R_s$, respectively, is done after $I_s$ received an update related to the two objects.

If the received update is a whole object along with its version vector, then the version vector of the received update is compared with the version vector of the object in $I_s$. If the received object has a version vector newer or older than the version vector of the object in $I_s$, then there will be no conflict between the two objects and the received object will either replace the object in $I_s$ or be thrown away. If the version vector of the two objects conflicts, then the two objects are in conflicts and the predefined reconcile method will be called on the object in the $I_s$ and $R_s$.

If the received update is differential update with its update stamp, then the differential updates associated with the corresponding object in $I_s$ will be compared with the common version vector $rvv^{ij}$ of the summarizing version vectors of I and R. If no differential update of the object in $I_s$ is newer than or conflicts with $rvv^{ij}$, then there is no conflict between the object in $I_s$ and the corresponding object in $R_s$. Otherwise, all differential updates of the object in $I_s$ that are newer than or conflicting with $rvv^{ij}$ conflict with the received update and they will be all passed to the reconcile method of the object in $I_s$ to resolve the conflict.

Update Log Reduction—For each of Is and Rs, called the first object container, if the other object container, called the second object container, is among the first object container's selected set of object containers that are considered in the process of the update log reduction of the first object container, then the summarizing version vector of the summarizing object container will be recorded in the first object container and the following steps for the update log reduction will be executed. First, the summarizing version vectors of other object containers that were recorded in the first object container are checked. If the summarizing version vectors of all the object containers selected by the first object container has been recorded, the latest common version vector of the first object container will be computed or re-computed. The latest common version vector of the first object container computed here contains only the object container identifiers which are included in each of the summarizing version vectors of the other object containers recorded in the first object container and the summarizing version vector of the first object container itself. Each time stamp in the latest common version vector of the first server is the smallest of the corresponding time stamps in the summarizing version vector of the other object containers recorded in the first object container and the summarizing version vector of the first object container itself. Next, if the latest common version vector of the first object container is updated, all the log entry in the update log of the first object container are scanned, and the updates, that is, the deletion of whole objects and the records of differential updates whose version vector or update stamps whose version vectors or update stamps are older than or equal to the latest common version vector of the first object container, are purged off from the update log of the first object container. As can be seen from its definition above, the latest common version vector of the first object container represents the latest state of the object container which are common to all the other object containers selected by the first object container and the first object container itself. Therefore, the semantics of the purging off of the updates in the update log of the first object container is that any update which has propagated in all the other object containers selected by the first object container is eventually removed from the first object container. This, in general, can free some of the memory and disk space used by the first object container.

A program listing in C describing the above system is contained in the Appendix.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims equivalent thereto:

What is claimed is:

1. A system for synchronizing objects at two servers, comprising:
    servers at two separate locations;
    a network linking said servers;
    means at one of said servers for synchronizing objects at said servers either on a whole object basis or a differential basis; and,
    means for causing said synchronizing means to switch between whole object synchronization and differential synchronization.

2. The system of claim 1 wherein said means for causing said synchronizing means to switch includes means for ascertaining the available resources at one of said servers and for switching to whole object synchronization when resources at a server cannot support differential synchronization.

3. A method for synchronizing objects at two servers so as to minimize the amount of data transmitted by avoiding the necessity for exchanging version vectors of individual objects, comprising the steps of:
    providing an object container at each of the servers, each of the object containers adapted to contain an object;
    providing a summarizing version vector for each object container that summarizes the state of each of the objects at a server, the summarizing version vector summarizing the state of the object container and having update stamps each having a field for the identifier associated with the object container and a field for a time stamp which corresponds to the last time when the object container created, modified or deleted any object thereat, the time stamp being generated by the object container when an object therein is created, modified, or deleted; and,
    initiating synchronizing by transmitting only a single summarizing version vector from a first server to a second server, and returning updates all at once from the second server to the first server if the associated version vectors of objects at the second server are newer than or conflict with the received summarizing version vector from the first server, or if the updated time stamps of the individual objects at the second server are newer than or conflict with the time stamps associated with the summarizing version vector from the first server.

4. The method of claim 3, wherein said synchronizing step includes performing differential synchronization based on the summarizing version vectors and the update stamps to create differential updates, such that the differential synchronization is accomplished by transmitting only those parts of objects which have changed as indicated by the differential updates.

5. The method of claim 4, and further including the steps of generating a latest common version vector and using the latest common version vector to purge off selected differential updates.

6. The method of claim 3 and further including the step of restarting a synchronization from the point of a previous failure with data from an unaffected server, with the point of failure and the existence of an unaffected server being determined by the summarizing version vectors associated with the servers.

7. The method of claim 3, and further including the steps of updating both the version vector of an object corresponding to an update from a first server to a second server, and the summarizing version vector in the second server immediately after the second server receives an update from the first server, such that synchronization can be restored without resending updates which are already received by the second server by comparing the summarizing version vector of the first server with the updated version vector of the second server, thus to provide fine grain synchronization.

8. A method for propagating updates from a first server to a second server and detecting and resolving conflicts in the synchronization of objects at the two servers, comprising the steps of:

sending a summarizing version vector from the first server to the second server;

upon receiving the summarizing version vector of the first server, sending the summarizing version vector of the second server back to the first server followed by all of the identifiers of objects which exist in the second server and that can support differential synchronization;

upon receiving the summarizing version vector and identifiers from the second server, determining at the first server the identifiers from the received identifiers corresponding to which the objects do not exist in the first server;

calculating at the first server the common version vector of the summarizing version vectors of the two servers;

determining at the first server all of the identifiers of objects that can support differential synchronization and which version vectors to the bases, absent all of the corresponding differential updates, are newer than the calculated common version vector, the first and second determined identifiers of objects being those objects which can not realize differential synchronization in the undergoing synchronization, and which therefore must be switched to whole object synchronization;

sending the identifiers of objects which must switch to whole object synchronization to the second server;

upon receiving the identifiers from the first server, calculating at the second server the common version vector of the summarizing version vectors of the two servers;

determining at the second server the identifiers of objects different from the received identifiers that can support differential synchronization and which version vectors to the bases, absent all of the corresponding differential updates, are newer than the calculated common version vector, the determined objects being those objects which can not realize differential synchronization in the undergoing synchronization, and therefore must be switched to whole object synchronization;

adding the received identifiers to the determined identifiers as the set of identifiers of objects which, if sent from the second server to the first server, must send as whole objects;

comparing at the second server the version vectors of individual objects, including those that can not support differential synchronization and those that can support differential synchronization and which identifiers are in the set of identifiers determined by the second server, with the summarizing version vector of the first server;

extracting the objects which have a version vector newer than or conflicting with the summarizing version vector of the first server as the updates that are the whole objects;

comparing at the second server the update stamps of individual differential updates that were applied to the objects at the second server which have an identifier not in the set of identifiers determined by the second server;

extracting the differential updates which have an update stamp newer than or conflicting with the summarizing version vector of the first server;

sending all of the extracted updates along with their corresponding object identifier and version vectors or update stamps from the second server to the first server in a consistent order;

upon finishing sending the updates to the first server, purging off the latest common ancestor version vector of the second server and some or all of the differential updates at the second server;

upon receiving an update along with the corresponding object identifiers and version vector or update stamp from the second server, determining whether the received update is a whole object or differential update;

comparing the received version vector with the version vector of the corresponding object at the first server if the received update is a whole object and throwing away the received object if the received version vector is older than or equal to the version vector of the object at the first server;

replacing the object at the first server with the received object if the received version vector if newer than the version vector of the object at the first server, or identifying that there is a conflict between the object at the first server and the received object and having the object at the first server resolve the conflict if the received version vector conflicts with the version vector of the object at the first server;

comparing the received update stamp with the summarizing version vector of the first server if the received update is a differential update;

throwing away the received differential update if the received update stamp is older than or equal to the summarizing version vector of the first server;

otherwise comparing the summarizing version vector of the second server with the update stamp of each differential update at the first server which was applied to the corresponding object at the first server;

extracting all the differential updates which have an update stamp newer than or conflicting with the summarizing version vector of the second server;

applying the received differential update to the object at the first server if there is no differential update extracted at the first server, or identifying that the received differential update conflicts with the differential updates extracted at the first server;

having the object at the first server resolve the conflict;

upon finishing receiving the updates from the second server, updating the latest common ancestor version vector of the first server; and, purging off some or all of the differential updates at the first server.

* * * * *